United States Patent [19]

Staszak

[11] Patent Number: 5,716,112
[45] Date of Patent: Feb. 10, 1998

[54] BREAK AWAY STUD

[75] Inventor: Michael Staszak, Kawkawlin, Mich.

[73] Assignee: International Engineering & Manufacturing Inc., Hope, Mich.

[21] Appl. No.: 692,233

[22] Filed: Aug. 7, 1996

[51] Int. Cl.⁶ .................................................. B62D 55/26
[52] U.S. Cl. ............................ 305/180; 305/160; 411/5; 411/386
[58] Field of Search .................................. 411/2, 3, 4, 5, 411/8, 386; 305/180, 165, 160, 162

[56] References Cited

U.S. PATENT DOCUMENTS

| | | | |
|---|---|---|---|
| 3,138,987 | 6/1964 | Wing | 411/4 |
| 3,782,787 | 1/1974 | Rubel et al. | 305/35 |
| 3,838,894 | 10/1974 | Reedy | 305/35 |
| 3,883,190 | 5/1975 | Kilbane, Jr. | 305/35 |
| 3,973,808 | 8/1976 | Janssen et al. | 305/54 |
| 4,054,045 | 10/1977 | King, Jr. | 411/386 X |
| 4,194,583 | 3/1980 | Aaen | 305/35 |
| 4,659,267 | 4/1987 | Uno et al. | 411/5 |
| 4,758,055 | 7/1988 | Anderson | 305/35 |
| 4,958,972 | 9/1990 | Shinjo | 411/5 X |
| 5,234,266 | 8/1993 | Musselman et al. | 305/54 |
| 5,284,386 | 2/1994 | Rubel | 305/54 |
| 5,299,860 | 4/1994 | Anderson | 305/54 |
| 5,401,088 | 3/1995 | Rubel | 305/54 |
| 5,474,408 | 12/1995 | Dinitz et al. | 411/5 |
| 5,499,892 | 3/1996 | Reed | 411/5 |

Primary Examiner—Russell D. Stormer
Attorney, Agent, or Firm—John J. Swartz

[57] ABSTRACT

A traction stud for an endless snowmobile belt including an elongate rod having a ground engagable end and a threaded end which can be coupled to the track with a threaded fastener. A slot is cut into the threaded portion of the track such that the terminal end threaded portion is separated from the remaining threaded portion by a gap but coupled thereto via a reduced stem which, after installation, can be broken away so that the remaining portion of the stud shank is flush with the fastener. The invention also contemplates the method of making the stud and the method of installing the stud with a transverse slot providing a weakened break away portion which can be severed by the application of transverse force to remove the axially inner terminal end of the stud.

37 Claims, 3 Drawing Sheets

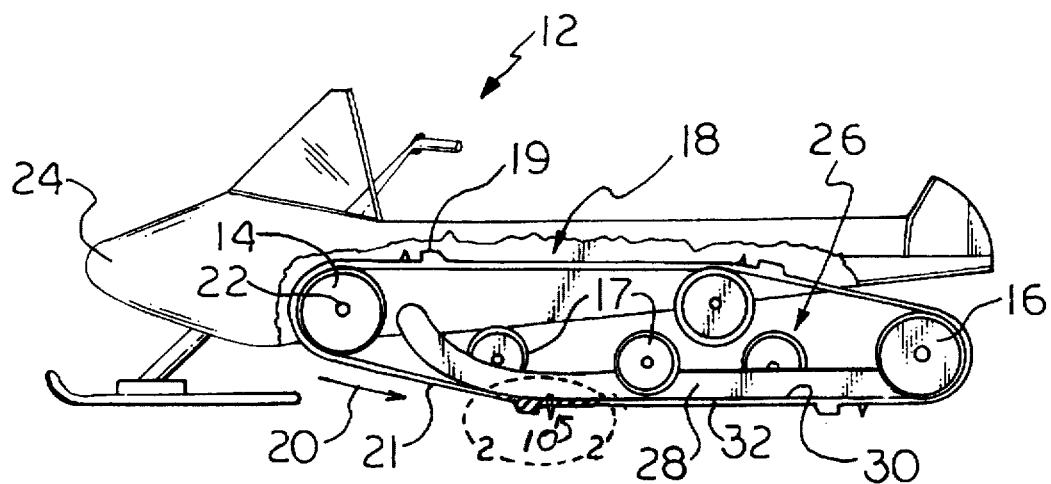
Fig. 1
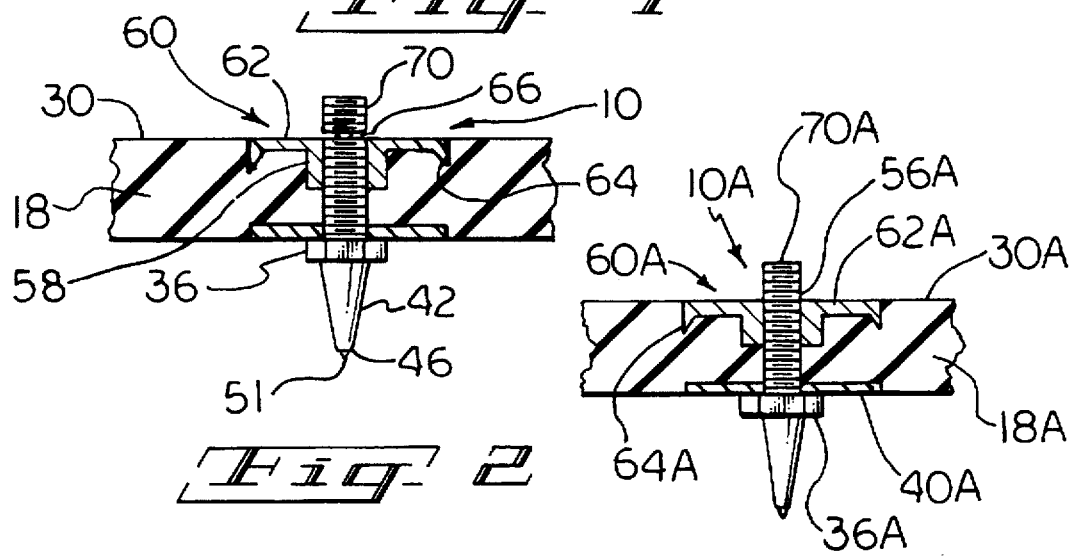
Fig. 2
Fig. 3 (PRIOR ART)

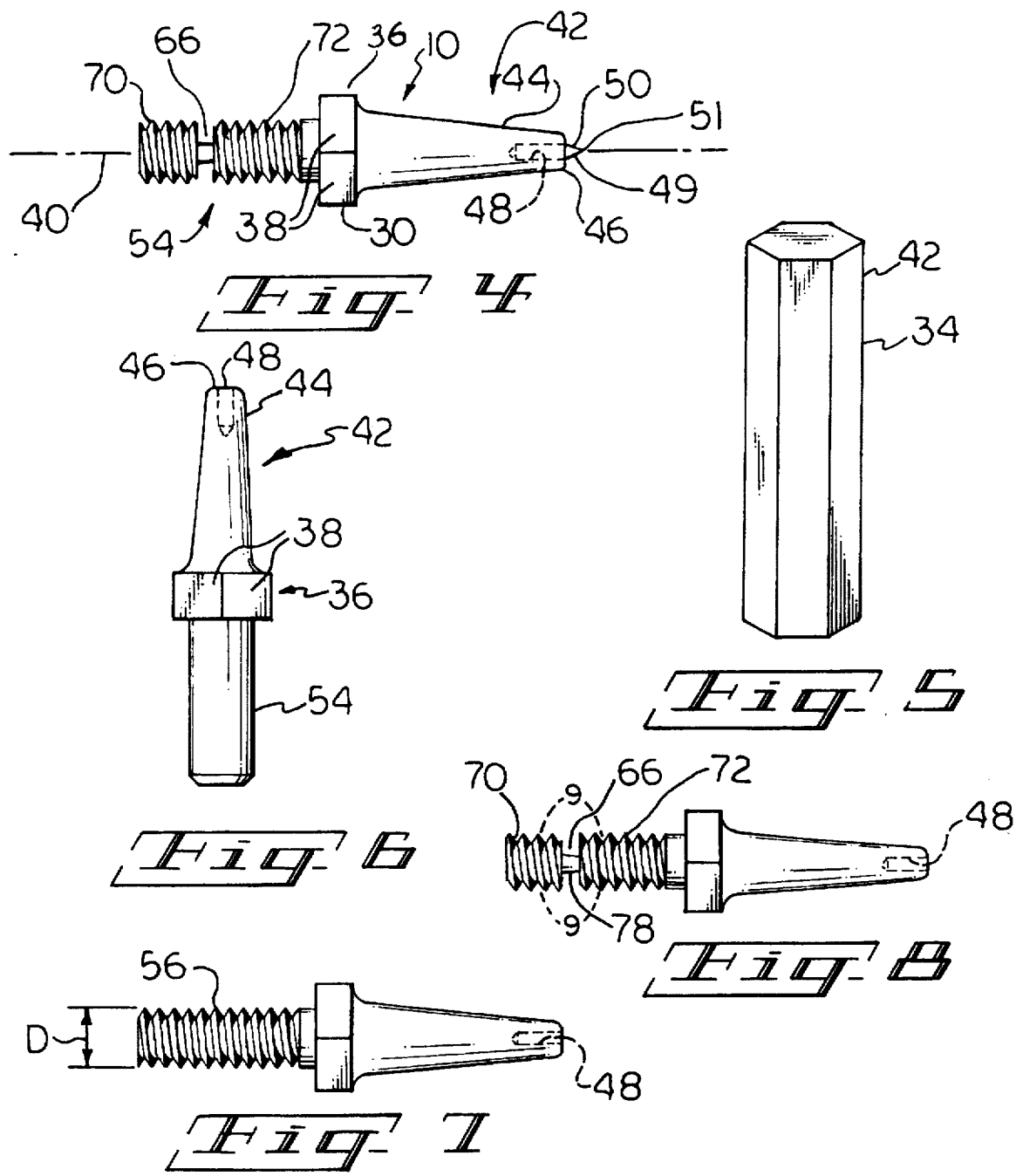

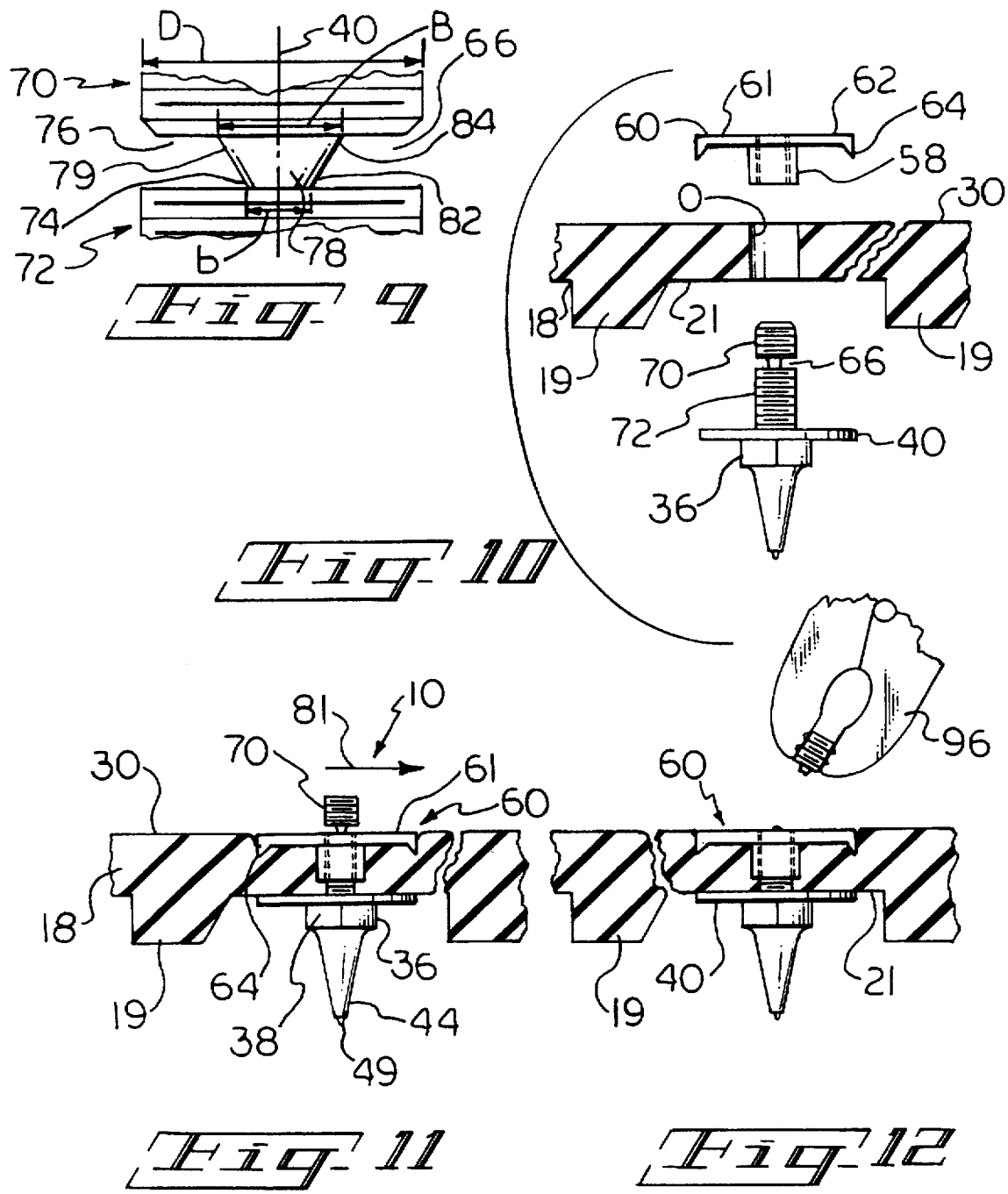

BREAK AWAY STUD

BACKGROUND OF THE INVENTION

1. Field of the Invention

This invention relates to a traction device and more particularly to a snowmobile stud having an inner terminal end portion which is broken away from the remainder of the stud after installation on an endless snowmobile belt.

2. Description of the Prior Art and Objects

Studs for snowmobile tracks have been provided heretofore such as that illustrated in U.S. Pat. No. 5,234,266 issued to James R. Musselman et al on Aug. 10, 1993, U.S. Pat. No. 5,299,860 issued to Lynn J. Anderson on Apr. 5, 1994, and the U.S. Pat. No. 4,758,055 issued Lynn J. Anderson on or About Jul. 19, 1988.

Such snowmobile studs are sometimes referred to as pass-through studs each having a shank which passes through an opening in the track and integrally mounts, at one end, an integral head which bears against the inner surface of the track. A nut is threaded onto the stud on the outer surface of the track.

Another type of ice stud is that illustrated in U.S. Pat. No. 3,973,808 issued to Jansen et al on Aug. 10, 1976 and assigned to James R. Musselman. A similar type stud is illustrated in U.S. Pat. No. 3,838,894 issued to Donald G. Reedy on Oct. 1, 1994 and U.S. Pat. No. 5,401,088 issued to Edward R. Rubel on or about Mar. 28, 1995.

Each of the three latter mentioned patents discloses a snowmobile stud having an axially outer ice penetrating pointed end and an axially inner end which is received in an aperture provided in a snowmobile belt. An enlarged tool engageable midportion mounts a plate or washer which bears against the outer track surface. A so-called "T-nut" is threaded onto the threaded inner end of the shank to securely fasten the stud to the snowmobile belt. As the stud is threaded into the threaded fastener, the snowmobile belt, which is resilient, will typically compress between the washer and T-nut. After installation, depending upon the thickness of the belt, an axially inner terminal end portion of the ice stud may project axially inwardly of the threaded fastener. If the axially inwardly projecting terminal stud end happens to be aligned with the idler wheels and drive sprocket wheels, undesirable stud breakage and track vibration can result. Accordingly, it is an object of the present invention to provide a new and novel traction stud which will minimize vibration and stud breakage.

Sometimes, a backer plate is mounted on the inside of the track with apertures therethrough which receive and pass the axially inner ends of the studs before the nuts are threaded onto the axially inner ends of the studs. These backer plates are of varying thicknesses depending on the material utilized. In the prior art, if the stud is of sufficient length to allow the nut to threadedly engage the terminal end of the stud mounted on a relatively thick backer plate, when mounted on a relatively thinner backer plate, the terminal end of the stud will project axially inwardly beyond the inner face of the nut and track. Accordingly, it is an object of the present invention to provide a stud which will accommodate backer plates on the inside of the track of differing thicknesses and yet, not interfere, after installation, with the idler rollers or idler sprocket wheels.

It has been found according to the present invention, that if, after installation, the axially inner terminal end portion of the stud is removed, the remaining portion of the stud will be flush with the threaded fastener to preclude interference of the stud with the idler sprockets and drive sprocket wheels. Accordingly, it is an object of the present invention to provide a new and novel stud having an inner terminal end portion which can be easily and quickly removed from the stud after installation on a snowmobile track.

A further object of the present invention is to provide a method of making a stud and method of installing a stud which will include a break away inner end portion that is removed after the stud is installed on the track.

It has been found according to the present invention, that a slot may be cut into the stud shank to provide a gap between an axially inner terminal end and an axially outer threaded portion, but coupled thereto via a reduced thickness stem that can be broken away by the application of transverse force thereto. Accordingly, it is an object of the present invention to provide a new and novel traction device including an axially inner threaded portion having a slot cut therein to provide a reduced thickness stem coupling an axially outer threaded end portion of the snowmobile stud to the adjacent threaded portion of the shank.

It is yet another object of the present invention to provide a snowmobile stud having an axially inner threaded shank provided with an annular slot that provides an annular gap surrounding a stem having a truncated cone.

It has been found, according to the present invention, that by shaping the stem such that the smallest diameter portion thereof is axially outermost and immediately adjacent the axially outer threaded portion, that the stem, upon the application transverse force, will break away immediately adjacent to the axially outer threaded portion. Accordingly, it is an object of the present invention to provide a stud for a snowmobile belt or the like for the type described including a stem that has its smallest diameter at the axially outermost portion thereof.

It is yet a further object of the present invention to provide a traction stud of the type described including a breakaway coupling stem having a cross sectional area immediately adjacent to the axially outermost threaded portion that is smaller than any of the remaining cross sectional area of the stem.

It is another object of the present invention to provide a stud for a snowmobile track or the like including an axially inner threaded portion for fastening to a snowmobile belt and including an annular slot of the type described surrounding a frustoconically shaped stem having a side wall which converges radially inwardly in an axially outer direction.

Other objects and advantages of the present invention will become apparent to those of ordinary skill in the art as the description thereof proceeds.

SUMMARY OF THE INVENTION

A traction stud for mounting on an endless snowmobile drive belt or the like comprising an elongate rod having an elongate axis, an axially outer ground engaging end, and an opposite, axially inner track mounting end having an axially inner terminal end, and a tool engageable portion intermediate the ends; the track mounting end includes an elongate threaded shank of predetermined breadth for threadedly receiving a complementally threaded mounting nut, and a slot is cut into the elongate threaded shank axially outwardly of the terminal end to provide a break away stem having a reduced breadth relative to the predetermined breadth of the threaded shank.

DESCRIPTION OF THE DRAWINGS

The invention may be more readily understood by referring to the accompanying drawings, in which:

FIG. 1 is a side elevational view of a snowmobile incorporating a snowmobile stud constructed according to the present invention, parts of the snowmobile being broken away to more particularly illustrate the snowmobile belt and part of the snowmobile belt being illustrated partly in section to more particularly illustrate the snowmobile stud, constructed according to the present invention, after installation but prior to final assembly;

FIG. 2 is a greatly enlarged sectional side view of the portion of the track and stud illustrated in the chain line circle 2—2 of FIG. 1 subsequent to the installation but prior to having the axially inner end being broken away;

FIG. 3 is a sectional side view, similar to FIG. 2, illustrating a prior art construction;

FIG. 4 is a side elevational view of the stud, turned 90° relative to its position in FIG. 2, prior to installation;

FIG. 5 is a perspective view of a hexagonal bar stock illustrating the first step of manufacture;

FIG. 6 illustrates a subsequent step in the manufacturing process wherein the hexagonal bar stock, illustrated in FIG. 5, is machined at opposite ends;

FIG. 7 illustrates a subsequent step in the manufacture more particularly illustrating an axially inner, shank end being threaded;

FIG. 8 is a side elevational view, similar to FIG. 7, illustrating a subsequent manufacturing step wherein an annular slot is cut into the axially inner threaded shank end;

FIG. 9 is a further greatly enlarged fragmentary side elevational view of the connecting stem portion encircled in the chain line circle 9—9 of FIG. 8;

FIG. 10 is an exploded sectional side view of the ice stud prior to installation on a snowmobile belt and prior to coupling to a T-nut;

FIG. 11 is a side elevational view of the ice stud illustrating a subsequent step of the assembly after the stud is installed on a snowmobile belt; and FIG. 12 is a side elevational view of the ice stud in a final step of assembly, illustrating the axially inner portion being broken away by a pair of pliers or the like.

DESCRIPTION OF PREFERRED EMBODIMENT

A traction stud, generally designated 10, is particularly adapted for use on a snowmobile, generally designated 12, which includes a forward rotatable drive wheel sprocket wheel 14, a rearward, rotatable idler wheel 16 and a plurality of smaller diameter idler wheels 17. An endless, resilient snowmobile track, generally designated 18, is trained around the wheels 14, 16 and 17 for movement in an endless path of travel, illustrated by the arrow 20. The track 18 may include a plurality of integral cleats 19 spaced along the outer track surface 21.

The front drive sprocket wheel 14 is mounted on a shaft 22 which is coupled to a gasoline engine (not shown) mounted on the snowmobile hull 24, as usual. The snowmobile includes a suspension system, generally designated 26, including wear strips 28 which glide along the inner surface 30 of the lower run 32 of the track 18. Such weather strips may suitably comprise nylon or other suitable plastic material.

The stud 10 may be machined from an elongate bar 34 (FIG. 5) of stainless steel stock. The stud 10 includes an enlarged, intermediate flange portion 36 having a plurality of wrench receiving flats 38 defining a multi-sided head which can be accommodated in a socket wrench or the like used to turn the stud 28 about its longitudinal axis 40 (FIG. 4). The bar 34 is machined at an axially outer end, generally designated 42, to provide a tapering or conically shaped ground engaging portion 44 which has a diameter that gradually decreases towards the tip 46.

The ground engaging portion 44 of the stud axially outward of the intermediate wrench receiving section 36 has a gradually reduced diameter in an axially outward direction and includes an axially extending, axially aligned, cylindrical recess or receptacle 48 receiving a hardened wear member or rod 49 fabricated from wear resisted material, such as tungsten, carbide, or the like. The insert 49 is detachably held in the recess 48 via a press fit and/or solder (not shown). The terminal portion of the carbide wear rod 49 has outwardly converging side faces 50 defining a conical point 51 (FIG. 4).

The opposite, axially inner track engaging end 54 of the bar 34 is threaded along its length with a uniform thread 56 (FIG. 7) for receiving the internally threaded cylindrical collar portion 58 (FIGS. 2 and 10) of a so-called T-nut, generally designated 60, having an enlarged diameter track engaging head 62 provided with two or more circumferentially spaced apart tangs 64 which penetrate into the upper inside track surface 30 of the track 18. The tangs 64 dig into the inside track surface 30 to inhibit rotation of the T-nut 60 as the stud 10 is being threaded thereon.

An annular slot 66 is cut into the track engaging threaded portion 56 to provide a narrow gap 68 which divides the thread 56 into an axially inner threaded portion 70 and an axially outer portion 72. The axial length of the slot 66 is substantially less than the axial length of the T-nut threaded collar 58 so that the collar 58 can bridge the slot 66 and simultaneously threadedly engage axially inner and outer portions 70 and 72 as the stud is being threaded into the nut 60. The axially outer portion 74 (FIG. 9), immediately adjacent the axially outer threaded section 72, of the slot 66 is cut to a deeper depth than is the axially inner slot portion 76 immediately adjacent the axially inner threaded portion 70 to provide a frusto-conically shaped stem 78 having an annular side wall 79 which converges radially inwardly in an axially outer direction. The stem 78 is integrally coupled to the axially inner threaded section 70 via an axially inner stem portion 84 of a predetermined breadth or diameter B which, as illustrated, is substantially less than one-half the breadth or diameter D of the threaded sections 70 and 72. The stem 78 is integrally coupled to the axially outer threaded section 72 via an axially outer stem portion 82 of a substantially lesser breadth or diameter b than the breadth B of coupling stem portion 84.

PRIOR ART

A prior art construction of the type illustrated in the Reedy U.S. Pat. No. 3,838,894 is illustrated in FIG. 3 and includes a stud 10A having an axially inner threaded section 56A threadedly received by a T-nut 60A having an enlarged head 62A flush with the inner track surface 30A of a track 18A. Depending on the axial thickness of a washer or grouser bar 40A, mounted atop a wrench receiving, intermediate flange 36A, the axially inner threaded end 70A of the threaded shank 56A extends inwardly of the inner track surface 30A. This projection 70A will sometimes strike the sprocket wheels 40 causing the stud 10A to fracture and/or create vibration which is disadvantageous.

THE METHOD OF MANUFACTURE

The stud 10 is manufactured from a piece of hexagonal, stainless steel bar stock 34, illustrated in FIG. 5. The axially outer end 42 of the bar is machined to provide the tapered, shaped ground engaging end 44. The opposite end is machined to provide the reduced diameter shank 54 (FIG. 6). The thread 56 is then cut into the reduced diameter shank 54 as illustrated in FIG. 7. The axially extending cylindrical slot 48 is also drilled into the ground engaging end 44 along the stud axis 40 for receiving the carbide rod 49.

The slot 66 is then cut into the threaded shank 54 to provide the tapering break-away stem 78 which is in the shape a truncated cone. The axially outer end 82 of stem 80 has a predetermined diameter or breadth b which is substantially less than the diameter or breadth B of the axially inner stem end 84 such that when side-wise or transverse force is exerted on the axially inner threaded end 70, in the direction of the arrow 81 (FIG. 11), the axially outer break away stem portion 82 will fracture or fail adjacent the axially outer threaded portion 72.

A solder drop is deposited into the end slot 48 and the hardened carbide wear member 49 is then inserted into slot 48 to the position illustrated in FIGS. 4 and 11.

THE METHOD OF INSTALLATION AND ASSEMBLY

To assemble the stud, a plurality of apertures O (FIG. 10) are cut or punched into the belt 18 so that the openings O are neither longitudinally nor transversely aligned. A threaded collar portion 58 of the T-nut 60 is inserted into each opening O from the inside 30 of the track 18. A stabilizing washer or plate 40 is then placed over the threaded stud end 54 in abutting relation with the wrench engaging flange 36 in the position illustrated in FIG. 10. The washer bearing threaded stud end 56 is then inserted into the track opening O from the outside 21 of the track 18. Instead of inserting the threaded stud end 56 into a washer 40, the threaded stud end 56 may be inserted through an opening provided in an inverted U-shaped cleat or grouser bar (not shown) conventionally found on having a snowmobile track. The thicknesses of the grouser bars or washers 40 can vary depending on the type of material.

The threaded shank portion 56 is then threadedly engaged with the T-nut sleeve 58 by means of a wrench engaging the wrench engaging flats 38 until the tangs 64 are embedded in the inside surface 30 of the belt 18 and the outer surface 61 of the T-nut head 60 is flush with the inside track surface 30 as illustrated in FIG. 11. A pair of pliers 96 is then used to grip the axially inner threaded shank portion 70 to apply side-wise force, in the direction of the direction of the arrow 81, which causes the axially inner threaded portion 70 and axially inner stem end 84 to transversely, radially outwardly bend, relative to the axially outer threaded portion 72 and relative to the axially outer stem end 82. The bending causes the radially outermost portion of the axially inner threaded section 70 to axially move toward the confronting portion of the axially outer threaded section 72 to close a portion of the gap 66 remote from the stem 78. This transverse force causes the truncated cone shaped break-away stem 78 to break, fail, or fracture along its axially outer end 82 adjacent the axially outer threaded portion 72. The resulting construction is as illustrated in FIG. 12 wherein the objectionable, axially inner projecting portion 68, 72 is removed so as not to interfere with the idler and sprocket wheels 14, 16 and 17.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A traction stud for mounting in an aperture provided in an endless snowmobile drive belt, having inner and outer endless surfaces, said stud comprising:

an elongate rod having
an elongate axis,
an axially outer, ground engageable end,
an axially inner track mounting end having an axially inner terminal end, and
a tool engageable portion intermediate said ground engageable end and said track mounting end;

said track mounting end including
an elongate threaded shank of predetermined breadth for threadedly receiving a complementally threaded fastener on said inner endless surface of said snowmobile drive belt, and
a slot cut into said elongate threaded shank, axially outwardly of said axially inner terminal end, to provide an axially inner threaded section adapted to be received inwardly of said inner endless surface, an axially outer threaded section having an axially inner end for being disposed flush with said inner endless surface, and a break-away stem, having a reduced breadth relative to said predetermined breadth of said threaded shank, integrally coupled to said axially inner threaded end and said axially inner end of said axially outer threaded section;

said reduced breadth being substantially less than one-half of said predetermined breadth.

2. The traction stud set forth in claim 1 wherein said slot comprises an annular slot.

3. The traction stud set forth in claim 1 wherein said slot comprises an annular slot and said stem comprises a truncated cone.

4. The traction stud set forth in claim 3 wherein said truncated cone includes an annular side wall which converges in a direction toward said ground engageable end.

5. The traction stud set forth in claim 1 wherein said slot divides said threaded shank into an axially inner threaded portion and an axially outer threaded portion detachably coupled together by said break-away stem.

6. The traction stud set forth in claim 5 wherein said stem includes an axially outer portion, immediately adjacent said axially outer threaded portion, which has a right cross-sectional area that is less than the right cross-sectional area of the remaining portion of said stem.

7. The traction stud set forth in claim 5 wherein said stem includes an axially outer stem portion immediately adjacent said axially outer threaded portion of predetermined diameter and an axially inner stem portion, immediately adjacent said axially inner threaded portion, having a greater predetermined diameter.

8. The traction stud set forth in claim 7 wherein said stem has an axially outwardly converging side wall.

9. The traction stud set forth in claim 1 wherein said break-away stem includes a tapered wall which converges in a direction toward said ground engageable end.

10. A traction stud for mounting in an aperture provided in an endless snowmobile drive belt, having inner and outer surfaces, said stud comprising:

an elongate rod having
an axially outer, ground engageable end, and
an axially inner threaded shank for mounting in said aperture of said snowmobile drive belt;
said threaded shank having an axially outer threaded section, of a predetermined diameter, for being received by said aperture and having an axially inner end for being disposed flush with said inner surface of said drive belt;

an axially inner, break-away threaded section, axially separated from said outer threaded section by a gap and having said predetermined diameter, for being received inwardly of said inner surface of said drive belt; and a break-away stem having a substantially reduced diameter integrally coupled to said axially inner threaded section and integrally, but detachably, coupled to said axially inner end of said axially outer threaded section via an axially outer reduced stem section to allow said axially inner threaded section, when subjected to transverse force thereon, to radially outwardly bend relative to said axially outer threaded section and close a portion of said gap remote from said stem causing said stem to break-away from said axially outer threaded section so that said axially inner end of said axially outer threaded section is disposed flush with said inner surface;

said substantially reduced diameter being substantially less than one-half of said predetermined diameter.

11. The traction stud set forth in claim 10 wherein said stem includes an axially inner end of predetermined breadth and an axially outer end, adjacent said axially inner end of said axially outer threaded section, of a lesser breadth to provide a reduced strength portion adjacent said axially outer threaded portion when transverse force is applied to said axially inner threaded section.

12. The traction stud set forth in claim 10 wherein said stem comprises a truncated cone having an axially outwardly converging side wall.

13. A traction stud for mounting in an aperture provided in an endless snowmobile drive belt or the like, having inner and outer endless surfaces, said stud comprising:

an elongate rod having
 an elongate axis,
 axially inner and outer ends,
 a threaded shank at said axially inner end, and
 a ground engageable portion at said axially outer end adapted to be disposed outwardly of said outer endless surface;

said threaded shank including
 an axially outer threaded section of predetermined breadth, for being received in said aperture, having an axially inner terminal end adapted to be disposed flush with said inner endless surface;
 an axially inner threaded section of said predetermined breadth, adapted to be disposed inwardly of said inner endless surface, spaced axially inwardly of said axially outer section and separated therefrom by a gap; and
 a break-away coupling stem of substantially reduced breadth, substantially less than one-half of said predetermined breadth, integrally coupled to said axially inner threaded section and integrally, but partibly coupled to said axially inner end of said axially outer threaded section to allow said axially inner threaded section to transversely bend relative to said axially outer threaded section and close a portion of said gap remote from said stem so that said stem is broken away from said axially inner terminal end of said axially outer threaded section.

14. The traction stud set forth in claim 13 wherein said breadth of said stem gradually decreases in an axially outward direction.

15. The traction stud set forth in claim 14 wherein said stem comprises an annular side wall which radially inwardly converges in an axially outward direction.

16. In combination, an endless snowmobile drive track including inside and outside track surfaces and at least one opening therethrough extending between said inside and outside track surfaces;

said track having a first predetermined thickness between said inside and outside surfaces;

a backer plate having a second predetermined thickness mounted on said outside track surface and including an aperture therethrough in registry with said one opening;

a traction stud including
 an elongate rod, having an elongate axis, including
  an axially inner end having an axially inner terminal end disposed inwardly of said inside track surface;
  a mounting shank at said axially inner end,
  a ground engageable, axially outer, opposite end positioned outwardly of said outside track surface;

said mounting shank having a predetermined breadth and being threaded for receiving a threaded fastener on said inside track surface;

a transverse slot provided in said mounting shank axially outward of said axially inner terminal end but inwardly of said inside track surface to provide
 an axially outer threaded section, disposed in said aperture and said opening, for threadedly receiving said threaded fastener to secure said stud to said track and having an axially inner end disposed flush with said inside track surface,
 an axially inner threaded section spaced from said axially outer threaded section by a gap, and
 a stem, integrally coupled to said axially inner threaded section by an axially inner stem portion of predetermined breadth and integrally but partibly connected to said axially inner end of said axially outer threaded section by an axially outer stem portion of a lesser predetermined breadth to allow said axially inner threaded section and said stem to break-away from said axially outer threaded section;

said axially outer threaded section having an axial length substantially equal to the sum of said first and second predetermined axial thicknesses so that said axially inner end of said axially outer threaded section is flush with said inside track surface.

17. In combination an endless snowmobile drive track including inside and outside track surfaces;

said drive track including at least one opening therethrough extending between said inside and outside track surfaces;

a traction stud comprising
 an elongate bar having
  an elongate axis,
  an axially inner end,
  a threaded mounting shank at said axially inner end, and
  a ground engageable opposite, axially outer end positioned outwardly of said outside track surface;

said threaded mounting shank including
 an axially inner threaded section, of predetermined diameter, for threadedly receiving engaging a threaded fastener on said inside track surface; and an axially outer threaded section, of said predetermined diameter, spaced from said axially inner threaded section by a slot for receiving said threaded fastener from said axially inner threaded section on the inside surface of said track to secure said stud to said track said axially outer threaded section being received by said opening and having an axially inner end disposed flush with said inside track surface; and a break-away coupling stem, disposed in said slot having
an axially inner stem portion of a predetermined breadth, integrally coupled to said axially inner threaded section, and
an axially outer stem portion, of substantially lesser breadth than said predetermined breadth, integrally but detachably partibly coupled to said axially inner end of said axially outer threaded section to allow said axially inner threaded section to radially bend relative to said axially outer threaded section and to axially close a portion of said slot remote from said stem forcing said axially outer stem portion to sever from said axially outer threaded section such that said axially outer threaded section remains flush with said inner surface of said track and said axially inner threaded section and said stem portion can be discarded;

said predetermined breadth of said axially inner stem portion being substantially less than one-half of said predetermined diameter.

18. The traction stud set forth in claim 17 wherein said stem has an axially outer end adjacent said axially outer threaded section which has a cross-sectional area less than the cross-sectional area of the remainder of said stem to facilitate a breaking of the stem adjacent said axially outer threaded section.

19. The traction stud set forth in claim 17 wherein said slot comprises an annular slot, said stem including an annular side wall which radially inwardly converges in an axially outer direction.

20. The combination set forth in claim 17 wherein including said threaded fastener, which includes an internally threaded, axially extending collar mounting a transverse head which bears against said inside surface of said track; said collar having an axially extending, internal thread having an axial length which is greater than the axial length of said slot to allow said internal thread to bridge said slot as the stud is being turned into said fastener.

21. A method of manufacturing and assembling said stud on a traction stud for a snowmobile drive belt or the like comprising the steps of:

providing a ground penetrable end at one axially outer end of a bar stock and a threaded mounting shank of predetermined breadth at the opposite axially inner end of said bar stock; and cutting a slot in said threaded mounting shank to provide an axially outer threaded section and an axially inner terminal end threaded section coupled to said axially outer threaded section by a break-away stem, having a breadth substantially less than one-half of said predetermined breadth; and transversely bending said axially inner threaded section relative to said axially outer threaded section to close a portion of said slot remote from said stem to severe said stem from said axially outer threaded section.

22. The method of manufacturing and assembling a traction stud set forth in claim 21 wherein said step of cutting is accomplished by cutting an annular slot to provide an annular stem having a side wall which radially inwardly converges in an axially outward direction.

23. The method of manufacturing and assembling set forth in claim 21 wherein said step of providing a ground penetrable end in one axially outer end is accomplished by machining a taper into said one axially outer end to provide a side wall which converges radially inwardly in an axially outward direction; said step of providing a threaded mounting shank is accomplished by cutting a uniform thread into said opposite, axially inner end of said bar stock.

24. The method of manufacturing and assembling set forth in claim 23 wherein said step of cutting said slot comprises cutting the portion of said slot of depth adjacent said axially outer threaded portion to a predetermined depth and cutting the remaining portion of said slot to a lesser predetermined depth.

25. The method of manufacturing and assembling set forth in claim 21 wherein said cutting step is accomplished by radially inwardly cutting said bar stock immediately adjacent said axially outer threaded section to a deeper depth than the remaining portion of the slot is cut such that the remaining portion of said stem immediately adjacent said axially outer threaded section has a lesser breadth than the remaining portion of said stem and a lesser breadth than said outer threaded section.

26. In combination with an endless snowmobile drive belt having inner and outer endless surfaces and at least one aperture therethrough:

a traction device comprising:
an elongate ground engageable stud received by said aperture and having
a longitudinal axis,
an axially outer ground engageable end disposed outwardly of said outer endless surface, and
an axially inner track mounting portion having
axially inner and outer, axially aligned threaded sections of a predetermined diameter axially spaced apart by a gap, and a coupling stem disposed in said gap, having a breadth substantially less than one-half of said predetermined diameter, integrally coupled to said axially inner and outer threaded sections;
said axially inner threaded section being disposed inwardly of said inner endless surface;
said axially outer threaded section being disposed in said aperture and having an axially inner terminal end disposed flush with said inner endless surface;
said stem being responsive to transverse force being applied to said axially inner threaded section as to allow said axially inner threaded section, to be transversely moved relative to said axially outer threaded section to close a portion of said gap remote from said stem forcing said coupling stem to severe from said axially inner end of said axially outer threaded section which remains flush with said inner endless surface.

27. The traction stud set forth in claim 26 wherein said stem includes an axially inner stem portion adjacent said axially inner threaded portion of a predetermined breadth and an axially outer stem portion adjacent said axially outer threaded portion of a substantially lesser predetermined breadth to allow said axially outer stem portion to fracture and detach from said axially outer threaded portion when transverse force is applied to said stem.

28. The combination set forth in claim 26 wherein said stem comprises a truncated cone.

29. The traction stud set forth in claim 28 wherein said cone has a sidewall which converges radially inwardly in an axially outward direction.

30. The combination set forth in claim 26 wherein said stem has a radial thickness which is substantially greater adjacent said axially inner threaded section than adjacent said axially outer threaded section.

31. A traction stud for an endless snowmobile belt or the like, having inner and outer endless surfaces and an aperture therethrough, said stud comprising:

an elongate rod having
an elongate axis;
axially inner and outer ends;
a ground engageable point at said axially outer end;
a threaded stud mounting shank at said axially inner end;
said threaded shank including
an axially outer threaded section, adapted to be received by said aperture and having and axially inner end adapted to be disposed flush with said inner endless surface;
an axially inner threaded section disposed axially inwardly of said axially outer threaded section and separated therefrom by a gap; and
a break-away coupling stem spanning said gap and integrally coupled to said axially inner threaded section via an axially inner stem portion of a predetermined breadth substantially less than one-half of said axially inner threaded section and substantially less than one-half the breadth of said axially outer threaded section and integrally coupled to said axially outer threaded section via an axially outer stem portion of substantially lesser predetermined breadth substantially lesser than said predetermined breadth;

said stem being transversely bendable in response to transverse force being applied to said axially inner stem portion to facilitate said axially outer stem portion fracturing and separating from said axially outer threaded section at said axially inner end of said axially outer threaded section when transverse force is applied to said axially inner stem portion.

32. The stud set forth in claim 31 wherein said coupling stem comprises a truncated cone.

33. The stud set forth in claim 31 wherein said stem has a diameter which gradually decreases in an axially outer direction.

34. A method of manufacturing and assembling said stud on a traction stud for an endless snowmobile drive belt or the like comprising the steps of:

providing a ground engageable point at an axially outer end of an elongate rod and a threaded mounting shank at the axially inner end of said rod;
cutting a slot into said threaded shank to provide
axially inner and outer threaded sections axially spaced apart by a gap, and
a break-away stem disposed in said gap and integrally coupled to said axially inner threaded section by an axially inner stem portion of predetermined breadth and integrally coupled to an axially inner end of said axially outer threaded section by an axially outer stem portion of substantially lesser predetermined breadth; and
applying transverse bending force to said axially inner threaded section causing said axially inner stem portion to bend relative to said axially outer stem portion to partially close a portion of said slot remote from said stem and thereafter, causing said axially outer stem portion to break away from said axially inner end of said axially outer threaded section.

35. A method of assembling an elongate, snowmobile traction stud, having an axially outer, ground engaging end and
a threaded, axially inner end section including
an axially outer threaded portion and
an axially inner threaded, terminal end portion,
on an endless snowmobile track having
inside and outside surfaces and
at least one aperture extending through said track between said inside and outside surfaces, said method comprising the steps of:
inserting said axially inner threaded end section of said stud through said aperture in a direction from said outside surface toward said inside surface;
threading a threaded fastener on said inner threaded end section to dispose an axially inner end of said fastener substantially flush with said inner surface of said track and to dispose said axially inner threaded terminal end portion of said stud axially inwardly of said threaded fastener and secure said stud to said track; and
applying transverse force to said axially inner threaded terminal end portion of said stud and causing it to break away from said axially outer threaded portion of said stud so that the remaining axially inner end portion of said axially outer threaded portion of said stud is substantially flush with said axially inner end of said fastener and substantially flush with said inside surface of said track.

36. The method of assembly set forth in claim 35 wherein said step of applying transverse force includes the step of cutting a slot into said threaded end section of said stud to provide said axially inner terminal threaded end portion axially spaced from said axially outer threaded end portion but detachably coupled thereto via a stem having a breadth substantially less than one-half said predetermined breadth, and applying transverse force to said terminal end portion and said stem to fracture said stem adjacent said axially outer threaded end portion and allow said axially inner threaded end portion and said stem to be removed.

37. The method set forth in claim 35 wherein the step of applying transverse force is accomplished by transversely bending said axially inner end portion of said stud relative to said axially outer threaded portion of said stud to close a portion of said slot remote from said stem to sever said stem from said axially outer threaded end portion.

* * * * *